US012792950B2

(12) United States Patent
Degenhardt et al.

(10) Patent No.: US 12,792,950 B2
(45) Date of Patent: Nov. 10, 2026

(54) QUANTUM CIRCUIT

(71) Applicant: Forschungszentrum Jülich GmbH, Jülich (DE)

(72) Inventors: Carsten Degenhardt, Aachen (DE); Stefan Van Waasen, Hückelhoven (DE); Patrick Vliex, Aachen (DE)

(73) Assignee: FORSCHUNGSZENTRUM JÜLICH GMBH, Jülich (DE)

(*) Notice: Subject to any disclaimer, the term of this patent is extended or adjusted under 35 U.S.C. 154(b) by 25 days.

(21) Appl. No.: 18/728,784

(22) PCT Filed: Mar. 21, 2023

(86) PCT No.: PCT/EP2023/057186
§ 371 (c)(1),
(2) Date: Jul. 12, 2024

(87) PCT Pub. No.: WO2023/180304
PCT Pub. Date: Sep. 28, 2023

(65) Prior Publication Data

US 2025/0103934 A1 Mar. 27, 2025

(30) Foreign Application Priority Data

Mar. 22, 2022 (DE) ..................... 10 2022 000 985.4

(51) Int. Cl.
*G06N 10/40* (2022.01)
*G06N 10/70* (2022.01)

(52) U.S. Cl.
CPC ............. *G06N 10/40* (2022.01); *G06N 10/70* (2022.01)

(58) Field of Classification Search
CPC ............................... G06N 10/40; G06N 10/70
(Continued)

(56) References Cited

U.S. PATENT DOCUMENTS 11,860,666 B2 * 1/2024 Bunandar ............... G06E 3/008

OTHER PUBLICATIONS

International Search Report for PCT/EP2023/057186 mailed May 17, 2023 (5 pages).

(Continued)

*Primary Examiner* — Arnold M Kinkead
(74) *Attorney, Agent, or Firm* — Rothwell, Figg, Ernst & Manbeck, P.C.

(57) ABSTRACT

The invention relates to a quantum technology circuit (1) comprising the following circuit components (3, 4, 5, 6, 7, 8) that are locally associated with one another: a qubit circuit (3) with quantum states that can be adjusted as a function of a bias signal; a bias circuit (4) for applying an output bias signal (11), encoded by an input signal (10) of the bias circuit (4), to the qubit circuit (3); a read-out circuit (5), communicatively connected to the qubit circuit (3), for reading out a quantum state adjusting in response to the applied output bias signal (11) and for outputting a read-out signal (13) encoding the read-out quantum state; and an adjusting circuit (6), communicatively connected to the bias circuit (4) and the read-out circuit (5), for executing an iterative algorithm which applies iterative values for the input signal (10) to the bias circuit (4), starting with an initial value, and continues the iteration, as a function of the respective responsively output read-out signal (13) of the read-out circuit (5), until the output read-out signal (13) corresponds to the adjustment of a desired quantum state.

11 Claims, 1 Drawing Sheet

(58) Field of Classification Search
USPC .............................................. 326/2; 708/839
See application file for complete search history.

(56) References Cited

OTHER PUBLICATIONS

Zurita, M. E. P. V., et al. "Cryogenic Current Steering DAC With Mitigated Variability," IEEE Solid-State Circuits Letters, vol. 3, Jan. 1, 2020 (Jan. 1, 2020), pp. 254-257 DOI: 10.1109/LSSC.2020.3013443 XP093043225.
Rahman, M.T., et al. "A cryogenic DAC operating down to 4.2K," Cryogenics, Elsevier, Kidlington, GB, vol. 75, Mar. 2, 2016 (Mar. 2, 2016), pp. 47-55, DOI: 10.1016/J.CRYOGENICS.2016.02.003, ISSN: 0011-2275, XP029497596.
Degenhardt C., et al. "Systems Engineering of Cryogenic CMOS Electronics for Scalable Quantum Computers," 2019 IEEE International Symposium on Circuits and Systems (ISCAS), IEEE, May 26, 2019 (May 26, 2019), pp. 1-5, [retrieved on Apr. 29, 2019] DOI: 10.I109/ISCAS.2019.8702442 ISSN: 2158-1525, XP033574147.
Botzem T., et al. "Tuning methods for semiconductor spin-qubits," arxiy.org, Cornell University Library, 201 Olin Library Cornell University Ithaca, NY 14853, Jan. 11, 2018 (Jan. 11, 2018), DOI: 10.1103/PHYSREVAPPLIED.10.054026 XP081405769, 12 pages.

* cited by examiner

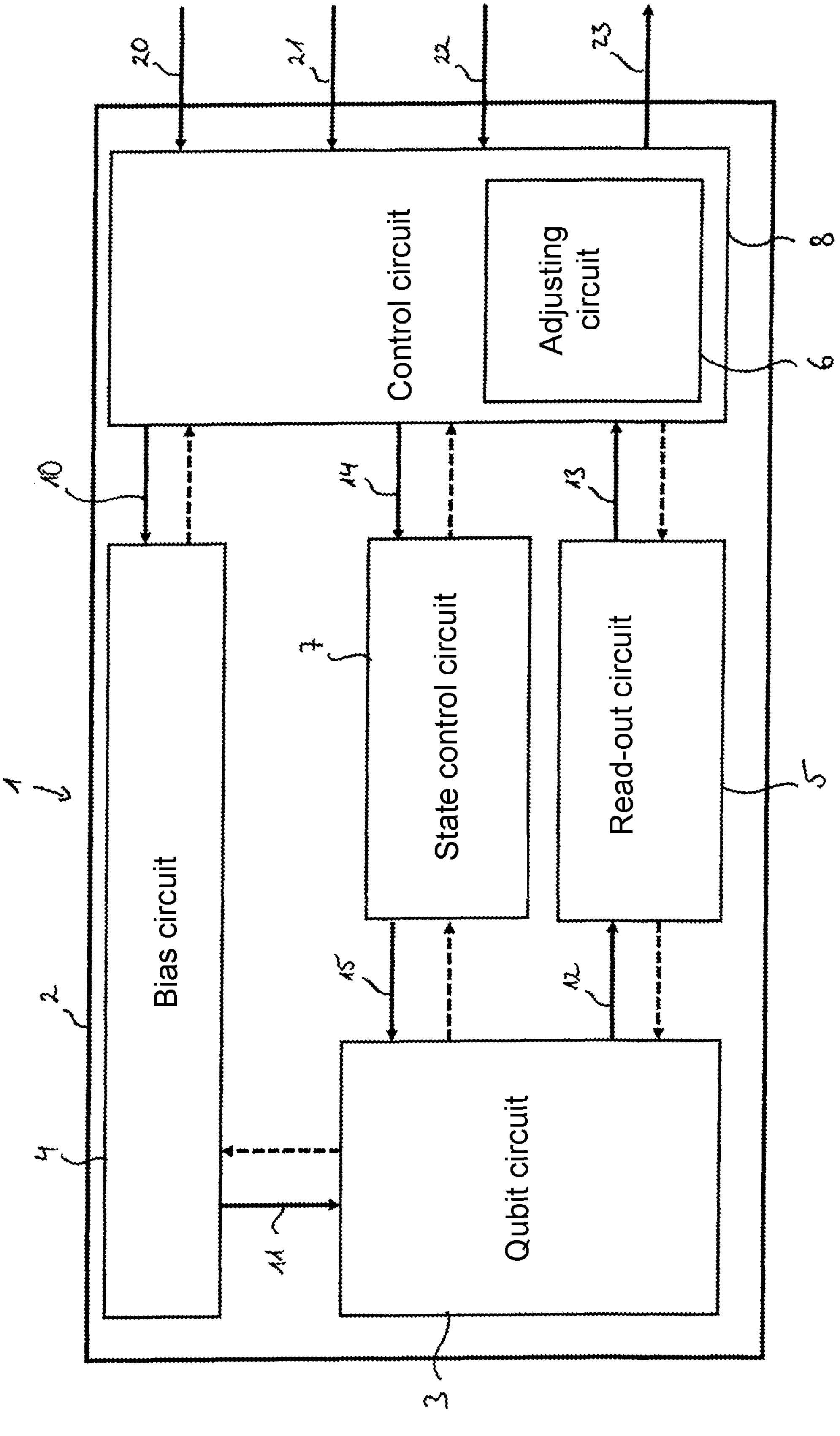
Control circuit
Adjusting circuit
State control circuit
Read-out circuit
Bias circuit
Qubit circuit
1
2
3
4
5
6
7
8
10
11
12
13
14
15
20
21
22
23

QUANTUM CIRCUIT

CROSS REFERENCE TO RELATED APPLICATION(S)

This application is a 35 U.S.C. § 371 National Stage of International Patent Application No. PCT/EP2023/057186, filed Mar. 21, 2023, claiming benefit from German Patent Application No. 10 2022 000 985.4, filed Mar. 22, 2022, designating the United States.

The invention relates to a quantum technology circuit.

At least one of the circuit components of the quantum technology circuit consists of a qubit circuit, which can be realized using different technologies, such as quantum dot technologies or superconducting quantum technologies. It is known in these technologies that to determine the operating points suitable quantum states of the qubit circuit are set by applying a corresponding bias signal. Such a suitable quantum state can serve to realize a physical qubit. This adjustment process (tuning) is traditionally carried out manually and is very time-consuming due to the large number of variables to be set, which can also be dependent upon one another.

In order to reduce the expenditure of time required for tuning, computer-based methods have been proposed in the past, some of which also use artificial intelligence. In all these methods, the quantum states of the qubit circuit, which is usually arranged in a cryostat, are read out and the read-out signals are transmitted to an external computer located outside the cryostat, in which computer they are stored and processed centrally. These methods do, however, have the disadvantage that their technical realization as hardware elements is complex due to the large number of data lines required from the qubit circuit to the external computer and they are, inter alia, not scalable due to the amount of data to be processed.

In contrast, the invention is based on the task of facilitating the adjustment of the operating point and, in particular, reducing the time expenditure required for the adjustment of the operating point.

According to the invention, this task is solved in that the quantum technology circuit comprises the following circuit components which are locally associated with one another:

a qubit circuit with quantum states that can be adjusted as a function of a bias signal;

a bias circuit for applying an output bias signal, encoded by an input signal of the bias circuit, to the qubit circuit;

a read-out circuit, communicatively connected to the qubit circuit, for reading out a quantum state adjusting in response to the applied output bias signal and for outputting a read-out signal encoding the read-out quantum state; and an adjusting circuit, communicatively connected to the bias circuit and the read-out circuit, for executing an iterative algorithm which applies iterative values for the input signal to the bias circuit, starting with an initial value, and continues the iteration, as a function of the respective responsively output read-out signal of the read-out circuit, until the output read-out signal corresponds to the adjustment of a desired quantum state.

In the quantum technology circuit according to the invention, the components used to realize the desired quantum state of the qubit circuits are locally associated with one another. Complex cabling with a computer located outside a circuit carrier is therefore omitted. An adjusting circuit for adjusting the operating point is locally associated with each qubit circuit. The data describing the state of the qubit circuit is therefore locally evaluated and the input signals to the bias circuit are locally determined. This solution is therefore scalable. The reading out of the quantum state of the qubit circuit, the evaluation and the setting of the bias signals can thereby be carried out by highly integrated electronics that are locally associated with a qubit or a group of qubits that can be realized with the aid of the qubit circuit.

The local association with the circuit components can be realized by the fact that they are embodied on a common one-piece circuit carrier. Individual circuit components can expediently be connected to each other by at least one interposer provided on the circuit carrier.

The qubit circuit comprises adjustable quantum states as a function of a bias signal. A suitable quantum state can serve to realize a physical qubit.

In one example, the qubit circuit can comprise one single circuit for generating a single physical qubit. Alternatively, the qubit circuit may comprise a single circuit for generating multiple physical qubits, for example two, three or more physical qubits. The physical qubits comprise physical qubit states. Alternatively, the qubit circuit may comprise a plurality of qubit circuits, wherein each qubit circuit of the plurality may serve to generate one or more physical qubit(s).

The quantum technology circuit further comprises a bias circuit for applying an output bias signal, encoded by an input signal of the bias circuit, to the qubit circuit. The bias signal can thus be used to adjust a suitable quantum state and thus the operating point of the qubit circuit. The output bias signal can, for example, be a voltage signal or a current signal. It is elucidated below how the input signal of the bias circuit is determined iteratively.

In addition, the quantum technology circuit comprises a read-out circuit that is communicatively connected to the qubit circuit. The read-out circuit serves to read out the quantum state that is adjusted in response to the applied output bias signal and to output a read-out signal encoding the read-out quantum state to the adjusting circuit. A specific realization of such a read-out circuit is elucidated below in connection with a specific example of a qubit circuit. In one embodiment, the read-out circuit may also be suitable for reading out the physical qubit state. Additionally, or alternatively, in one embodiment, the quantum technology circuit may comprise a state read-out circuit for reading out the physical qubit state.

To adjust the operating point, the quantum technology circuit further comprises an adjusting circuit. The adjustment of the operating point occurs by the adjusting circuit applying an initial value for the input signal to the bias circuit. In response to the input signal, the bias circuit applies an output bias signal encoded by the input signal to the qubit circuit. A specific quantum state of the qubit circuit is thereby adjusted. This quantum state is read out by the read-out circuit, encoded into a read-out signal and output to the adjusting circuit. As a function of this output signal, the adjusting circuit applies a new input signal to the bias circuit. This iteration is continued until the desired quantum state is adjusted. The operating point is then adjusted.

The qubit circuits that can be used for the solution according to the invention can, in particular, be known quantum dot circuits, which can be embodied as charge qubits or as spin qubits, in particular $ST_0$ spin qubits. These quantum dot circuits comprise control electrodes (gate electrodes) to which the bias signal is applied in the form of voltage levels, the values of which are used, for example, to adjust the charge state of the quantum dot circuit, which is to say, the number of electrons present there and/or their spin state.

Preferably, the bias circuit comprises a bias voltage generator circuit for generating a bias voltage. The output bias signal can comprise this bias voltage. Preferably, the bias circuit generating the bias signal is embodied as a digital-to-analog converter whose digital input signal encodes its analog output voltage signal, which output voltage signal is applied to the qubit circuit as an output bias signal.

A further example for a qubit circuit are superconducting quantum circuits, in particular transmon qubits, which likewise can be adjusted by an electrical bias signal.

In one embodiment of the invention, the read-out circuit can be arranged directly adjacent to the qubit circuit. “Directly adjacent” here means that no other circuit component is arranged between the qubit circuit and the read-out circuit. The read-out of the quantum state being adjusted by the read-out circuit can then be carried out in particular by translating the adjustment of the quantum state into a change in capacitance (charge to capacitance), which is then detected by means of RF reflectometry or charge-based capacitance measurement (CBCM). This allows the read-out circuit to detect very small changes in capacitance that depend on whether the tunneling of an electron is quantum mechanically forbidden or allowed due to the state of the qubit circuit (in the case of a spin qubit, the spin alignment). This is encoded in a read-out signal that corresponds to a logical 0 or a 1. By way of example, 1 indicates that tunneling is possible and 0 indicates that tunneling is quantum mechanically prohibited due to the Pauli spin blockade. The read-out signals 1 or 0 that are output by the read-out circuit thereby encode the respectively read out quantum state.

Alternatively, in one embodiment, the read-out of the quantum state being adjusted can be performed by a read-out circuit comprising a charge sensor, such as, for example, a quantum point contact (QPC) charge sensor or a single electron transistor or a sensing dot (SD) (see, for example, C. Meyer, “Quantum Computing with Semiconductor Quantum Dots,” E. Kammerloher et al, “Sensing dot with high output swing for scalable baseband read-out of spin qubits,” arXiv:2107.13598v1). Such an embodiment is particularly advantageous if the quantum state to be adjusted is related to a charge state or can be translated into a charge state. A read-out circuit comprising a charge sensor, and in particular the charge sensor itself, is also preferably arranged directly adjacent to the qubit circuit.

In a further embodiment, the bias circuit can be arranged directly adjacent to the qubit circuit. Here too, “directly adjacent” means that no other circuit component is arranged between the qubit circuit and the bias circuit.

The initial value used by the iterative algorithm of the adjusting circuits for the input signal to the base circuit can, in particular, be a value based on knowledge of the physical conditions of the qubit circuit. In particular, the physical characteristics of the qubit circuit can be used to determine the limits within which the bias signal must lie for a sensible mode of operation. Then, for example, a value in the middle between these limits can be selected as the initial value. Preferably, the iterative algorithm is based on a stability diagram that describes, for example, the number of electrons in the quantum dot circuit as a function of the voltage levels applied to its control electrodes.

The quantum technology circuit can optionally comprise a state control circuit which is communicatively connected to the qubit circuit and which, as a function of a control input signal, effects a manipulation of the physical qubit states of the qubit circuit, and the quantum technology circuit can optionally comprise a control circuit which is communicatively connected to the state control circuit and which, as a function of a command signal supplied from outside the circuit, either starts the adjusting mode of the adjusting circuit or is switched to a normal operating mode in which it outputs control input signals to the state control circuit. This allows qubit manipulations to be carried out, such as those, for example, required for applications in the field of quantum computing. The adjusting circuit can, in particular, be embodied as a component of the control circuit. Alternatively, in one example, the control circuit can be a circuit separate from the adjusting circuit. In this embodiment, the state control circuit and the control circuit are further circuit components of the quantum technology circuit.

In one embodiment of the invention, at least one of the circuit components may be program-controlled. In one embodiment, the at least one program-controlled circuit component may comprise, in particular, a microprocessor. For example, the qubit circuit and/or the bias circuit and/or the read-out circuit and/or the adjusting circuit and/or the state control circuit and/or the control circuit may be program-controlled. In one embodiment, at least one of the circuit components may be a hard-wired circuit component. In a further embodiment of the invention, at least one first circuit component may be program-controlled and at least one second circuit component may be a hard-wired circuit component.

In one embodiment of the invention, the adjusting circuit can comprise a Turing-complete processor. The iterative algorithm can then be executed on the Turing-complete processor. Alternatively, in one embodiment, the algorithm may be executed by hardwired hardware tailored to the iterative algorithm, according to an application specific integrated circuit (ASIC).

Low temperatures may be required to generate quantum states. The quantum technology circuit is then preferably arranged in a cryostat or the like. In such a case, it is advantageous if at least one circuit component of the quantum technology circuit is a cryogenic circuit component. In particular, the qubit circuit and/or the bias circuit and/or the read-out circuit and/or the adjusting circuit and/or the state control circuit and/or the control circuit is a cryogenic circuit. This enables a reliable function of the circuit components, even at low temperatures.

In one embodiment, the quantum technology circuit is manufactured using a CMOS manufacturing process. The circuit components can then be CMOS-based circuit components, and in particular CMOS-based cryogenic circuit components.

The circuit components can, in particular, be embodied on a common circuit carrier. The circuit carrier can, in particular, be embodied in one piece. In particular, the circuit carrier can be embodied from a semiconductor substrate. The circuit components can, for example, be embodied on, in particular directly on, or in the circuit carrier.

In the following description, the invention is elucidated in more detail with reference to the drawing. Wherein:

FIG. 1 shows a schematic representation of a quantum technology circuit according to the invention.

FIG. 1 shows a quantum technology circuit 1 according to the invention. The quantum technology circuit 1 comprises a circuit carrier 2. Several circuit components, namely a qubit circuit 3, a bias circuit 4, a read-out circuit 5, an adjusting circuit 6, a control circuit 8 containing the adjusting circuit 6 and a state control circuit 7 are arranged on the circuit carrier 2. The circuit components 4, 5, 6, 7, 8 can, for example, be embodied on, directly on, or in the circuit carrier 2. In the embodiment of the invention shown in FIG. 1, the circuit carrier 2 is embodied in one piece. However, the invention is not limited to this.

The qubit circuit 3 comprises adjustable quantum states as a function of a bias signal. To determine the operating points of the qubit circuit 3, suitable quantum states must be adjusted by applying a corresponding bias signal. Such a suitable quantum state can serve to realize a physical qubit. The qubit circuit 3 can, for example, comprise a quantum dot circuit. Additionally, or alternatively, the qubit circuit 3 may comprise a superconducting quantum circuit.

The quantum technology circuit 1 further comprises a bias circuit 4 for applying an output bias signal 11, encoded by an input signal 10 of the bias circuit 4, to the qubit circuit 3.

The qubit circuit 3 is also communicatively connected to the read-out circuit 5. The read-out circuit 5 serves to read out the quantum state of the qubit circuit 3, which is adjusted in response to the applied output bias signal 11, and to output a read-out signal 13 encoding the read-out quantum state. The read-out circuit 5 comprises a read-out function 12 for this purpose.

The circuit carrier 2 further comprises an adjusting circuit 6 as a circuit component that is communicatively connected to the bias circuit 4 and the read-out circuit 5, wherein the adjusting circuit is used for executing an iterative algorithm. Starting with an initial value, the iterative algorithm iteratively applies values for the input signal 10 to the bias circuit 4. In response to the input signal 10, the bias circuit 4 then applies an output bias signal 11 encoding the input signal 10 to the qubit circuit 3. A quantum state of the qubit circuit 3 is thereby adjusted. The quantum state is read out by the read-out circuit 5 and output to the adjusting circuit 6 as a read-out signal 13 encoding the read-out quantum state. As a function of the outputted read-out signal 13 of the read-out circuits 5, the iteration is now continued until the outputted read-out signal 13 corresponds to the adjustment of a desired quantum state.

The quantum technology circuit 1 according to the invention may further comprise a state control circuit 7, as shown in FIG. 1. This state control circuit 7 is, however, not required for the adjustment of the operating point and is optional. The state control circuit 7 is communicatively connected to the qubit circuit 3 and, as a function of a control input signal 14, causes a manipulation 15 of the physical qubit states of the qubit circuit 3.

The circuit carrier 2 further comprises a control circuit 8. In the embodiment shown, the adjusting circuit 6 is embodied as a component of the control circuit 8. Alternatively, the adjusting circuit 6 can be embodied separately from the control circuit 8. The control circuit 8 is communicatively connected to the state control circuit 7. The control circuit 8 can be connected to a power supply (not shown) located outside the circuit carrier 2 by means of a power supply line 20. This allows the circuit components of the quantum technology circuit 1 to be supplied with voltage. A command signal 21 can be supplied to the control circuit 8 from outside the circuit carrier 2. As a function of the command signal 21, either the adjusting operation of the adjusting circuit 6 can be started or it can be switched to a normal operating mode in which the control circuit 8 outputs control input signals 14 to the state control circuit 7. The form of the control input signals 14 can be specified externally by control signals 22. The control input signals 14 can cause the state control circuit 7 to manipulate 15 the physical qubit states of the qubit circuits 3. This allows applications in the field of quantum information processing to be realized.

The control circuit 8 can moreover comprise an output that can be used to output output signals 23 from the circuit 1. These output signals 23 can, for example, encode the quantum state of the qubit circuit 3 and/or a physical qubit state. The output signals 23 can, for example, be output to a computer (not shown) located outside the circuit carrier 2.

In the embodiment of the quantum technology circuit 1 according to the invention shown in FIG. 1, the read-out circuit 5 is arranged directly adjacent to the qubit circuit 3. This means that no other circuit component is arranged between the qubit circuit 3 and the read-out circuit 5. In addition, the bias circuit 4 is arranged directly adjacent to the qubit circuit 3.

As a concrete realization of the quantum technology circuit 1 shown in FIG. 1, an example is given in which the qubit circuit 3 comprises a quantum dot circuit. The quantum dot circuit can be embodied as a charge qubit or as a spin qubit, in particular as an $ST_0$ spin qubit. The bias circuit 4 can preferably comprise a bias voltage generator circuit for generating a bias voltage. Preferably, this bias voltage generator circuit is embodied as a digital-to-analog converter whose digital input signal 10 encodes its analog output voltage signal (which is to say, the output bias signal 11). The quantum dot circuit comprises control electrodes (gate electrodes) to which the output bias signal 11 of the bias circuit 4 is applied. This allows quantum states of the quantum dot circuit to be adjusted as charge states (which is to say, the number of electrons present there and/or their spin states). The number of electrons in the quantum dot can usually be adjusted by means of a plunger gate; this can also be controlled with a bias voltage. It is hereby possible to adjust the potential well, tunnel barriers between quantum dots and qubits, as well as the number of electrons in each quantum dot.

In the case of a quantum dot circuit, the quantum state that is being adjusted can, in particular, be read out by translating the adjustment of the quantum state into a change in capacitance (charge to capacitance). The change in capacitance can then be detected using RF reflectometry or charge-based capacitance measurement (CBCM). In this case, the read-out circuit 5 detects a very small change in capacitance, which depends on whether the tunneling of an electron is possible due to the spin alignment of the qubit or is quantum-mechanically prohibited due to the Pauli spin blockade. This is converted into a logical 0 or a logical 1 and transferred from the read-out circuit 5 to the adjusting circuit 6 as a read-out signal 13. For the translation of the quantum state into a change in capacitance, it is advantageous if the read-out circuit 5, as shown in FIG. 1, is arranged directly adjacent to the qubit circuit 3. In one example, the read-out circuit 5 can alternatively comprise a charge sensor, for example, a quantum dot charge sensor or a single-electron transistor or a sensing dot for reading out the quantum state that is being adjusted.

In the elucidated embodiment, at least one of the circuit components can be program-controlled. By way of example, the adjusting circuit 6 may comprise a Turing-complete processor for executing the iterative algorithm. Alternatively, the adjusting circuit 6 may, for example, comprise hard-wired hardware specially tailored to the iterative algorithm (in the sense of an application-specific integrated circuit (ASIC)).

Preferably, the qubit circuit 3, the bias circuit 4 and the read-out circuit 5 are realized on a chip. The chip is then arranged on the circuit carrier 2. It is advantageous if the read-out circuit 5 and the bias circuit 4 are arranged as close as possible to the qubit circuit 3. Inasmuch as the digital signals can be transmitted between the read-out circuit 5 and the adjusting circuit 6 as well as between the control circuit 8 and the bias circuit 4, spatial proximity is not so relevant here.

The signals exchanged between the circuit components are shown in FIG. 1 with arrows (reference signs 10, 11, 12, 13, 14), which also indicate the direction of the signal exchange. It is also however possible for further signals to be exchanged between the circuit components, for example signals associated with a communication protocol. Such optional signals are shown in FIG. 1 with dashed arrows.

LIST OF REFERENCE SIGNS

1 Quantum technology circuit
2 Circuit carrier
3 Qubit circuit
4 Bias circuit
5 Read-out circuit
6 Adjusting circuit
7 State control circuit
8 Control circuit
10 Input signal to the bias circuit
11 Output bias signal
12 Read-out function of the read-out circuit
13 Read-out signal
14 Control input signal
15 Qubit manipulation
20 Power supply
21 Command signal
22 Control signal
23 Output signal

The invention claimed is:

1. A quantum technology circuit comprising the following locally associated circuit components:

a qubit circuit with quantum states that can be adjusted as a function of a bias signal;

a bias circuit for applying an output bias signal encoded by an input signal of the bias circuit to the qubit circuit;

a read-out circuit, communicatively connected to the qubit circuit for reading out a quantum state adjusting in response to the applied output bias signal and for outputting a read-out signal encoding the read-out quantum state;

an adjusting circuit, communicatively connected to the bias circuit and the read-out circuit, for executing an iterative algorithm which applies iterative values for the input signal to the bias circuit, starting with an initial value, and continues the iteration, as a function of the respective responsively output read-out signal of the read-out circuit, until the output read-out signal corresponds to the adjustment of a desired quantum state, a state control circuit communicatively connected to the qubit circuit and which, as a function of a control input signal, effects a manipulation of the physical qubit states of the qubit circuit; and a control circuit communicatively connected to the state control circuit and which, as a function of a command signal supplied from outside the circuit, either starts the adjusting mode of the adjusting circuit or is switched to a normal operating mode in which it outputs control input signals to the state control circuit.

2. The circuit according to claim 1, wherein the qubit circuit comprises a quantum dot circuit and/or a superconducting quantum circuit.

3. The circuit according to claim 1, wherein the bias circuit comprises a bias voltage generator circuit for generating a bias voltage.

4. The circuit according to claim 3, wherein the bias voltage generator circuit comprises a digital-to-analog converter.

5. The circuit according to claim 1, wherein the read-out circuit is arranged directly adjacent to the qubit circuit.

6. The circuit according to claim 1, wherein the bias circuit is arranged directly adjacent to the qubit circuit.

7. The circuit according to claim 1, wherein at least one of the circuit components is program-controlled.

8. The circuit according to claim 1, wherein the adjusting circuit comprises a Turing-complete processor.

9. The circuit according to claim 1, wherein at least one circuit component of the quantum technology circuit is a cryogenic circuit component.

10. The circuit according to claim 1, wherein the quantum technology circuit is manufactured by means of a CMOS manufacturing process.

11. The circuit according to claim 1, wherein its circuit components are embodied on a common circuit carrier.

* * * * *